US008531389B2

(12) United States Patent
Johnson et al.

(10) Patent No.: US 8,531,389 B2

(45) Date of Patent: Sep. 10, 2013

(54) ELECTROPHORETIC DISPLAY PANEL USING SHAKE AND RESET PULSES

(75) Inventors: Mark Thomas Johnson, Eindhoven (NL); Guofu Zhou, Eindhoven (NL); Neculai Ailenei, Heerlen (NL)

(73) Assignee: Adrea, LLC, Sunnyvale, CA (US)

(*) Notice: Subject to any disclaimer, the term of this patent is extended or adjusted under 35 U.S.C. 154(b) by 2049 days.

(21) Appl. No.: 10/568,644

(22) PCT Filed: Aug. 5, 2004

(86) PCT No.: PCT/IB2004/051406

§ 371 (c)(1), (2), (4) Date: Feb. 16, 2006

(87) PCT Pub. No.: WO2005/020201

PCT Pub. Date: Mar. 3, 2005

(65) Prior Publication Data

US 2006/0290650 A1 Dec. 28, 2006

(30) Foreign Application Priority Data

Aug. 22, 2003 (EP) .................................... 03103211

(51) Int. Cl.

*G09G 3/34* (2006.01)

*G06F 3/038* (2013.01)

(52) U.S. Cl.

USPC ............................ 345/107; 345/214; 345/215

(58) Field of Classification Search

USPC ................. 345/107, 204, 214–215, 690–691; 359/296

See application file for complete search history.

(56) References Cited

U.S. PATENT DOCUMENTS

| | | | | |
|---|---|---|---|---|
| 4,041,481 | A * | 8/1977 | Sato | 345/107 |
| 4,187,160 | A | 2/1980 | Zimmermann | |
| 4,947,159 | A | 8/1990 | Di Santo et al. | |
| 5,961,804 | A | 10/1999 | Jacobson et al. | |
| 6,120,839 | A | 9/2000 | Comiskey et al. | |
| 6,130,774 | A | 10/2000 | Albert et al. | |
| 6,504,524 | B1 * | 1/2003 | Gates et al. | 345/107 |
| 6,531,997 | B1 | 3/2003 | Gates et al. | |
| 6,636,186 | B1 | 10/2003 | Horiuchi et al. | |
| 7,012,600 | B2 * | 3/2006 | Zehner et al. | 345/214 |
| 7,176,880 | B2 * | 2/2007 | Amundson et al. | 345/107 |
| 7,209,112 | B2 * | 4/2007 | Matsunaga et al. | 345/107 |
| 7,876,305 | B2 * | 1/2011 | Zhou et al. | 345/107 |
| 2002/0005832 | A1 | 1/2002 | Katase | |
| 2002/0196207 | A1 | 12/2002 | Machida et al. | |
| 2003/0081305 | A1 | 5/2003 | Chung et al. | |
| 2005/0179641 | A1 * | 8/2005 | Zhou et al. | 345/107 |

FOREIGN PATENT DOCUMENTS

| | | | |
|---|---|---|---|
| JP | 2001290178 | A | 10/2001 |
| WO | 02073304 | A2 | 9/2002 |

* cited by examiner

*Primary Examiner* — Bipin Shalwala

*Assistant Examiner* — Keith Crawley

(74) *Attorney, Agent, or Firm* — Finnegan, Henderson, Farabow, Garrett & Dunner, LLP

(57) ABSTRACT

An electrophoretic display panel and a method for driving an electrophoretic display panel in which the drive pulse, i.e. the grey scale pulse, to bring an element from a preceding optical state to an optical state is split in more than one sub-pulses. A more gradual introduction of the grey scale is thereby achieved reducing the suddenness of the transition form one image to another. Preferably application of the grey scale potential differences is preceded by application of reset pulses in which case the preceding optical state is an extreme optical state.

14 Claims, 10 Drawing Sheets

ELECTROPHORETIC DISPLAY PANEL USING SHAKE AND RESET PULSES

The invention relates to an electrophoretic display panel, comprising:

an electrophoretic medium comprising charged particles;

a plurality of picture elements;

electrodes associated with each picture element for receiving a potential difference; and drive means, the drive means being arranged for controlling the potential difference of each of the plurality of picture elements to be a greyscale potential difference for enabling the particles to occupy the position corresponding to image information.

The invention also relates to a method for driving an electrophoretic display device in which method grey scale pulses are applied to elements of the display device.

The invention further relates to drive means for driving an electrophoretic display panel.

An embodiment of the electrophoretic display panel of the type mentioned in the opening paragraph is described in International Patent Application WO 02/073304.

In the described electrophoretic display panel, each picture element has, during the display of the picture, an appearance determined by the position of the particles. The inventors have realized that during application of the grey scale potential differences the image on the display may show abrupt changes in the image which are unappealing to a viewer. In particular the transition from one image to another may be quite erratic.

It is an object of the invention to provide a display panel of the kind mentioned in the opening paragraph which is able to provide a smoother transition from one image to another.

The object is thereby achieved that the drive means are arranged for application for at least a subset of all drive waveforms of the grey scale potential difference to a picture element in two or more pulses which change the optical state of the system separated by a non-zero time interval.

Going from one image to another a picture element is set by means of an application of a grey scale potential difference. The inventors have realized that the introduction of a grey scale often is a visually quite abrupt phenomena which is experienced by a viewer as unappealing, reducing the overall image quality. In a display panel in accordance with the invention the grey scale potential difference is applied not in one singular drive pulse, but in more than one drive pulse separated by a non-zero time interval. The phrase “drive pulse” is in this application use as a short hand description of the application of a grey scale potential difference in the form of a pulse or pulses. Distributing of the grey scale potential difference over two or more pulses separated by a non-zero time interval leads to a smoother transition from one image to a next image.

“Grey scale” is to be understood to mean any intermediate optical state. When the display is a black and white display, “grey scale” indeed relates to a shade of grey, when other types of colored elements are used ‘grey scale’ is to be understood to encompass any intermediate state in between extreme optical states.

In embodiments the grey scale potential difference is at least for some transitions distributed over more than two pulses between which the optical state of the system remains substantially unchanged. This leads to an even further reduction of the shock effect.

In embodiments the grey scale potential difference is distributed over two pulses.

This type of driving scheme requires the least energy.

Preferably the drive means are further arranged for controlling the potential difference of each of the plurality of picture elements to be a reset potential difference having a reset value and a reset duration during a reset period prior to application of the grey scale potential differences.

The position of the particles depends not only on the latest applied potential difference(s) but also on the history of the potential difference(s). As a result of the application of the reset potential difference the dependency of the appearance of the picture element on the history is reduced, because particles substantially occupy one of the extreme optical positions (“black” or “white”) before a grey scale potential difference is applied. Since the position is fixed and known prior to application of grey scale difference any possible variation due to the history of application of potential difference is greatly reduced. Thus the picture elements are preferably each time reset to one of the extreme states. Subsequently, as a consequence of the application of the grey scale potential difference, the particles occupy the position to display the grey scale corresponding to the image information.

When the image information is changed the picture elements are reset and thereafter the grey scales are set by application of grey scale pulses. The application of the reset pulses leads to a an intermediate image, immediately prior to application of the grey scale pulse, which is purely “black and white”, i.e. without grey tone. Sudden changes in the appearance of the image when grey scale pulses are applied in a single pulse are then relatively easily noticeable, more noticeable then when one changes image having grey tones, to another image with grey tones. The invention is therefore in particular of interest when reset pulses are applied, without being restricted to devices or methods in which reset pulses are applied.

Preferably the drive means are arranged for application of the grey scale potential difference in two or more pulses wherein the applied pulses have, for the transition from an extreme optical state to a grey scale, decreasing time duration as the driving time increases. The driving time is within the concept of the invention the time passed since the onset of the first pulse. The initial optical response of an ink in the black or white state (i.e. at the “extreme optical states” after the reset) after applying a drive voltage is relatively slower than when the ink has moved away from these extreme optical states. For this reason in preferred embodiments the duration of drive pulses decreases as the driving time increases. In this case the image update appears to be optically even smoother.

Preferably the drive means are arranged for application of the grey scale potential difference in more than two pulses wherein, for the transition from an extreme optical state to a grey scale, the pulses are separated by at least two non-zero time intervals, and the time intervals increase as the driving time increases. The initial optical response of an ink in the black or white state (i.e. at the “extreme optical states” after the reset) after applying a drive voltage is relatively slower than when the ink has moved away from these extreme optical states. For this reason in preferred embodiments the time periods between drive pulses increases as the driving time increases. In this case the image update appears to be optically even smoother.

The invention is in particular advantageous when the drive means are able to control the reset pulses so that at least for some transitions an overreset is applied.

It is furthermore favorable, if the drive means are further able to control for each picture element the potential difference to be a sequence of preset potential differences before being the grey scale potential difference, the sequence of preset potential differences having preset values and associated preset durations, the preset values in the sequence alternating in sign, each preset potential difference representing a preset energy sufficient to release particles present in one of said extreme positions from their position but insufficient to enable said particles to reach the other one of the extreme positions. As an advantage, the sequences of preset potential differences reduce the dependency of the appearances of the picture elements on the history of the potential difference and reduces the time needed for application of the grey scale potential difference to bring an element to a specific optical state.

The transition to a grey level equivalent to or very close to an extreme optical state, or more in general equivalent to or very close to a preceding optical state, may, within the concept of the invention, still be applied in one short pulse, or one very long pulse, as long as for the transition to at least one intermediate grey scale, and preferably to the majority of grey scales from an extreme optical state two or more pulses separated by a nonzero time interval are used. Preferably for all transitions having a total application time longer than a lower threshold and shorter than an upper threshold two or more pulses are used. Application of the grey scale pulse is often bound by fixed time periods e.g. the frame time periods and there is a maximum to the number of frame time periods (e.g. N). Transitions requiring very short total pulse (0, 1 or possibly 2 times the fixed or frame time period) may be done in one unsplit pulse, as may be long pulses for transitions requiring N or N−1 times the fixed time period. At least for at a subset of all drive waveforms, wherein drive waveforms stands for the form of the drive pulse to bring an element from one optical state to a grey level optical state, the grey level pulse is split into two or more subpulses.

In accordance with the present invention, there is provided a method for driving an electrophoretic display device comprising:

- an electrophoretic medium comprising charged particles;
- a plurality of picture elements, in which method grey scale potential differences for setting a picture element to an optical state from a preceding optical state are applied for at least a subset of all drive waveforms in two or more pulses separated by a non-zero time interval.

Also in accordance with the present invention, there is provided drive means for driving an electrophoretic display panel, said display panel comprising:

- an electrophoretic medium comprising charged particles;
- a plurality of picture elements;
- electrodes associated with each picture element for receiving a potential difference;

said drive means being arranged for controlling the potential difference of each picture element to be a grey scale potential difference for enabling the particles to occupy the position corresponding to the image information, said drive means being further arranged for application of the grey scale potential difference for at least a subset of all drive waveforms for setting a picture element from a preceding optical state to a grey scale in two or more pulses which change the optical state of the system separated by a non-zero time interval.

Although the invention has been described for a display panel comprising a plurality of picture elements, it is clear for the man skilled in the art that the invention can also be used for a display panel comprising a single picture element, for instance in signage applications.

These and other aspects of the display panel of the invention will be further elucidated and described with reference to the drawings, in which.

In all the Figures corresponding parts are usually referenced to by the same reference numerals.

Figure 1:
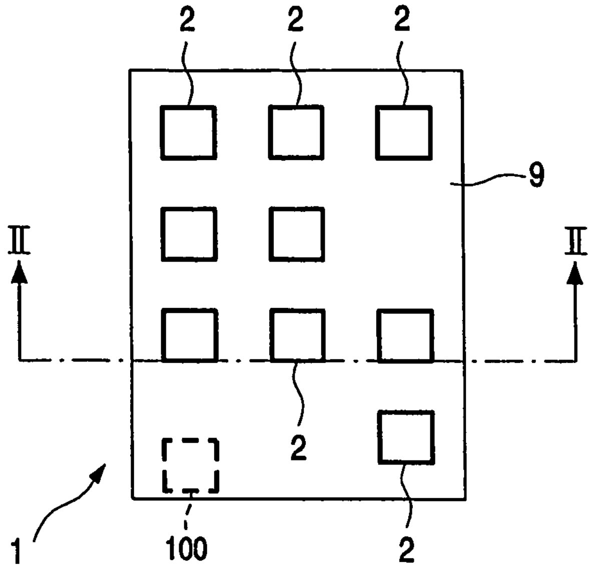
FIG. 1 shows diagrammatically a front view of an embodiment of the display panel.
Figure 2:
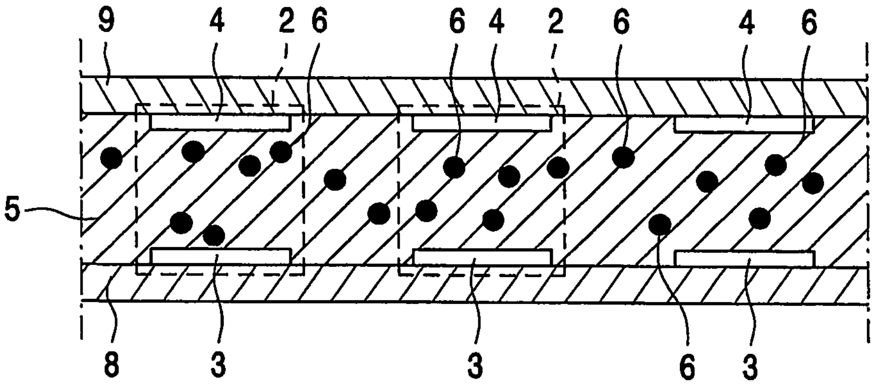
FIG. 2 shows diagrammatically a cross-sectional view along II-II in FIG. 1.

FIGS. 1 and 2 show an embodiment of the display panel 1 having a first substrate 8, a second opposed substrate 9 and a plurality of picture elements 2. Preferably, the picture elements 2 are arranged along substantially straight lines in a two-dimensional structure. Other arrangements of the picture elements 2 are alternatively possible, e.g. a honeycomb arrangement. An electrophoretic medium 5, having charged particles 6, is present between the substrates 8,9. A first and a second electrode 3,4 are associated with each picture element 2. The electrodes 3,4 are able to receive a potential difference. In FIG. 2 the first substrate 8 has for each picture element 2 a first electrode 3, and the second substrate 9 has for each picture element 2 a second electrode 4. The charged particles 6 are able to occupy extreme positions near the electrodes 3,4 and intermediate positions in between the electrodes 3,4. Each picture element 2 has an appearance determined by the position of the charged particles 6 between the electrodes 3,4 for displaying the picture. Electrophoretic media 5 are known per se from e.g. U.S. Pat. No. 5,961,804, U.S. Pat. No. 6,120,839 and U.S. Pat. No. 6,130,774 and can e.g. be obtained from E Ink Corporation. As an example, the electrophoretic medium 5 comprises negatively charged black particles 6 in a white fluid. When the charged particles 6 are in a first extreme position, i.e. near the first electrode 3, as a result of the potential difference being e.g. 15 Volts, the appearance of the picture element 2 is e.g. white. Here it is considered that the picture element 2 is observed from the side of the second substrate 9. When the charged particles 6 are in a second extreme position, i.e. near the second electrode 4, as a result of the potential difference being of opposite polarity, i.e. −15 Volts, the appearance of the picture element 2 is black. When the charged particles 6 are in one of the intermediate positions, i.e. in between the electrodes 3,4, the picture element 2 has one of the intermediate appearances, e.g. light gray, middle gray and dark gray, which are gray levels between white and black. The drive means 100 are arranged for controlling the potential difference of each picture element 2 to be a reset potential difference having a reset value and a reset duration for enabling particles 6 to substantially occupy one of the extreme positions, and subsequently to be a grey scale potential difference for enabling the particles 6 to occupy the position corresponding to the image information.

Figure 3:
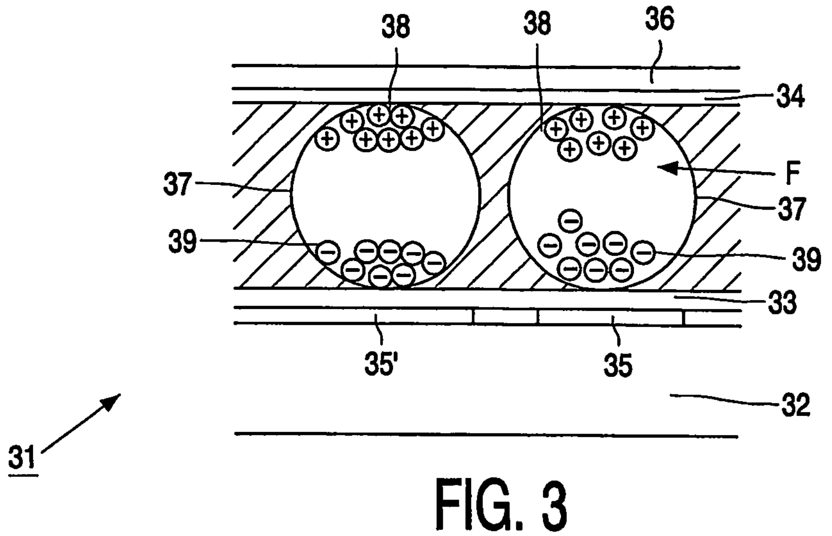
FIG. 3 shows diagrammatically a cross section of a portion of a further example of an electrophoretic display device.

FIG. 3 diagrammatically shows a cross section of a portion of a further example of an electrophoretic display device 31, for example of the size of a few display elements, comprising a base substrate 32, an electrophoretic film with an electronic ink which is present between two transparent substrates 33, 34 for example polyethylene, one of the substrates 33 is provided with transparent picture electrodes 35 and the other substrate 34 with a transparent counter electrode 36. The electronic ink comprises multiple micro capsules 37, of about 10 to 50 microns. Each micro capsule 37 comprises positively charged white particles 38 and negative charged black particles 39 suspended in a fluid F. When a positive field is applied to the pixel electrode 35, the white particles 38 move to the side of the micro capsule 37 directed to the counter electrode 36 and the display element become visible to a viewer. Simultaneously, the black particles 39 move to the opposite side of the microcapsule 37 where they are hidden to the viewer. By applying a negative field to the pixel electrodes 35, the black particles 39 move to the side of the micro capsule 37 directed to the counter electrode 36 and the display element become dark to a viewer (not shown). When the electric field is removed the particles 38, 39 remain in the acquired state and the display exhibits a bi-stable character and consumes substantially no power.

Figure 4:
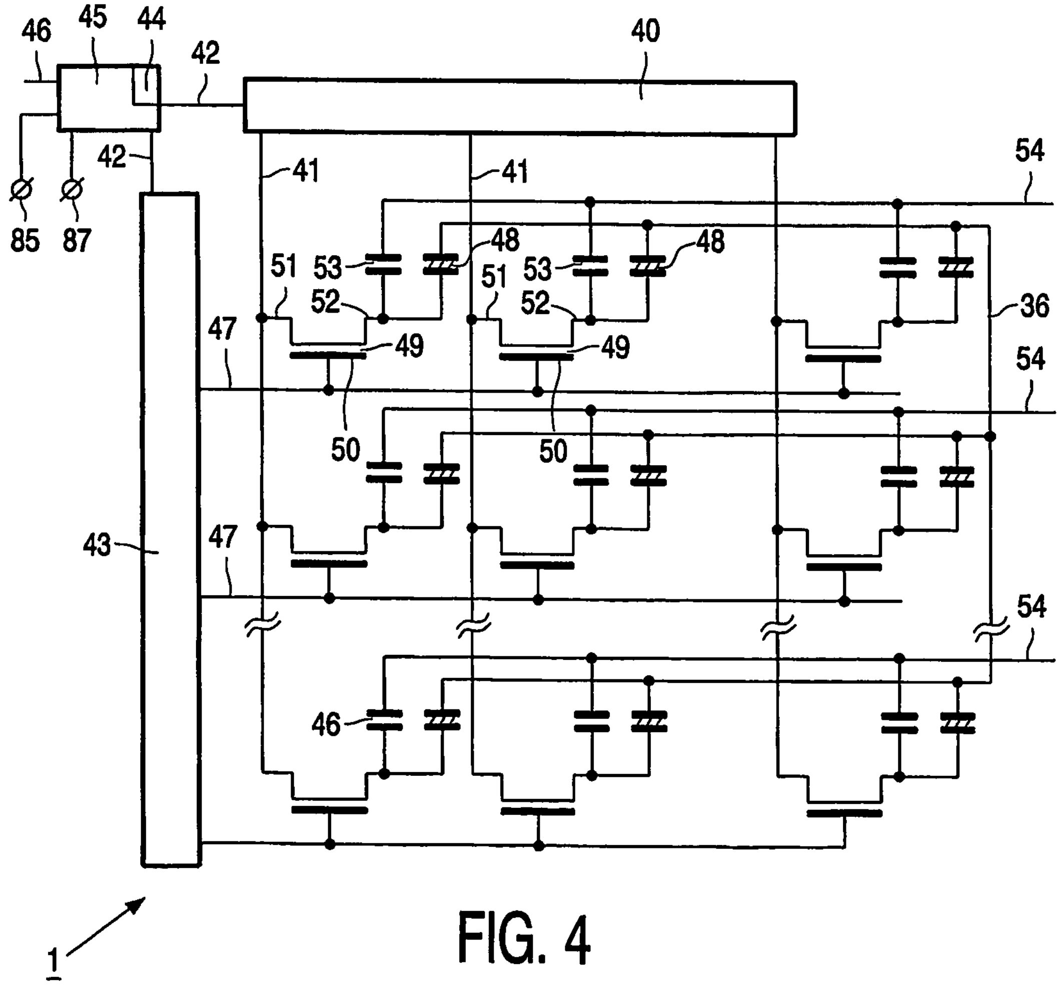
FIG. 4 shows diagrammatically an equivalent circuit of a picture display device of FIG. 3.

FIG. 4 shows diagrammatically an equivalent circuit of a picture display device 31 comprising an electrophoretic film laminated on a base substrate 32 provided with active switching elements, a row driver 43 and a column driver 40. Preferably, a counter electrode 36 is provided on the film comprising the encapsulated electrophoretic ink, but could be alternatively provided on a base substrate in the case of operation using in-plane electric fields. The display device 31 is driven by active switching elements, in this example thin film transistors 49. It comprises a matrix of display elements at the area of crossing of row or selection electrodes 47 and column or data electrodes 41. The row driver 43 consecutively selects the row electrodes 47, while a column driver 40 provides a data signal to the column electrode 41. Preferably, a processor 45 firstly processes incoming data 46 into the data signals. Mutual synchronisation between the column driver 40 and the row driver 43 takes place via drive lines 42. Select signals from the row driver 43 select the pixel electrodes via the thin film transistors 49 whose gate electrodes 50 are electrically connected to the row electrodes 47 and the source electrodes 51 are electrically connected to the column electrodes 41. A data signal present at the column electrode 41 is transferred to the pixel electrode 52 of the display element coupled to the drain electrode via the TFT. In the embodiment, the display device of FIG. 3 also comprises an additional capacitor 53 at the location at each display element. In this embodiment, the additional capacitor 53 is connected to one or more storage capacitor lines 54. Instead of TFT other switching elements can be applied such as diodes, MIM's, etc.

As an example the appearance of a picture element of a subset is light gray, denoted as G2, before application of the reset potential difference. Furthermore, the picture appearance corresponding to the image information of the same picture element is dark gray, denoted as G1. For this example, the potential difference of the picture element is shown as a function of time in FIG. 5A. The reset potential difference has e.g. a value of 15 Volts and is present from time $t_1$ to time $t'_2$, $t_2$ being the maximum reset duration, i.e. the reset period Preset. The reset duration and the maximum reset duration are e.g. 50 ms and 300 ms, respectively. As a result, after application of the reset potential, the picture element has an appearance being substantially white, denoted as W. The grey scale potential difference is present from time $t_3$ to time $t_4$ and has a value of e.g. −15 Volts and a duration of e.g. 150 ms. As a result the picture element has, after application of the grey scale potential difference, an appearance being dark gray (G1), for displaying the picture. The interval from time t2 to time t3 may be absent.

The maximum reset duration, i.e. the complete reset period, for each picture element of the subset is substantially equal to or more than the duration to change the position of particles 6 of the respective picture element from one of the extreme positions to the other one of the extreme positions. For the picture element in the example the reference duration is e.g. 300 ms.

Figures 5A, 5B:
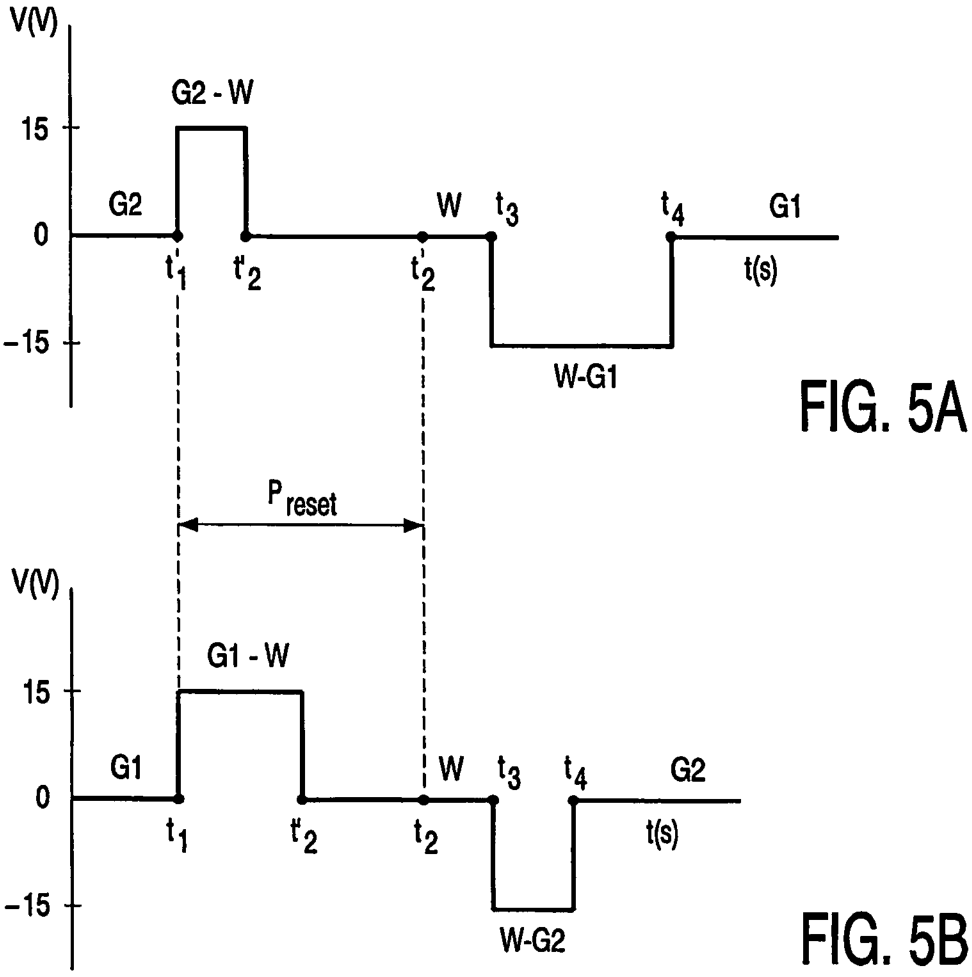
FIG. 5A shows diagrammatically the potential difference as a function of time for a picture element.
FIG. 5B shows diagrammatically the potential difference as a function of time for a picture element.

As a further example the potential difference of a picture element is shown as a function of time in FIG. 5B. The appearance of the picture element is dark gray (G1) before application of the reset potential difference. Furthermore, the picture appearance corresponding to the image information of the picture element is light gray (G2). The reset potential difference has e.g. a value of 15 Volts and is present from time $t_1$ to time $t'_2$. The reset duration is e.g. 150 ms. As a result the picture element has, after application of the reset potential difference, an appearance being substantially white (W). The grey scale potential difference is present from time t3 to time t4 and has e.g. a value of e.g. −15 Volts and a duration of e.g. 50 ms. As a result, after application of the grey scale potential difference, the picture element has an appearance being light gray (G2), for displaying the picture.

Figure 6A:
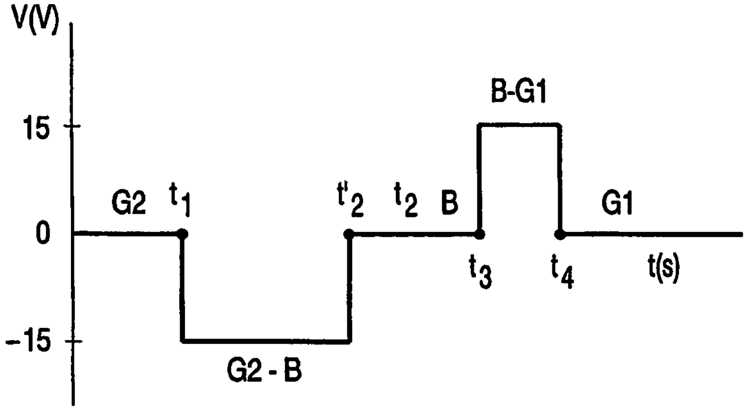
FIG. 6A shows diagrammatically the potential difference as a function of time for a picture element.
Figure 6B:
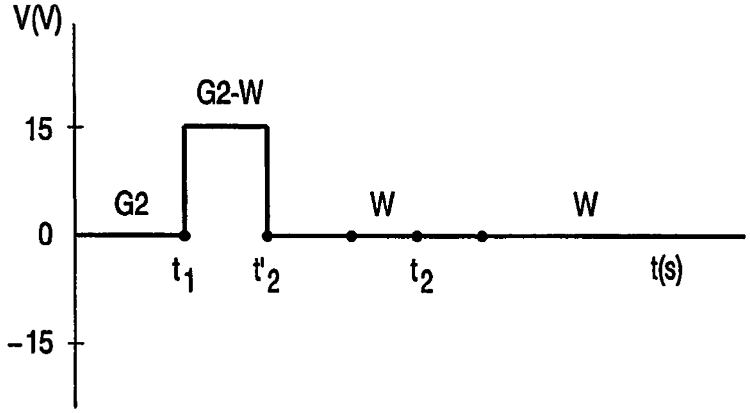
FIG. 6B shows diagrammatically the potential difference as a function of time for another picture element of the embodiment associated with FIG. 5A.

In another variation of the embodiment the drive means 100 are further arranged for controlling the reset potential difference of each picture element to enable particles 6 to occupy the extreme position which is closest to the position of the particles 6 which corresponds to the image information. As an example the appearance of a picture element is light gray (G2) before application of the reset potential difference. Furthermore, the picture appearance corresponding to the image information of the picture element is dark gray (G1). For this example, the potential difference of the picture element is shown as a function of time in FIG. 6A. The reset potential difference has e.g. a value of −15 Volts and is present from time $t_1$ to time $t'_2$. The reset duration is e.g. 150 ms. As a result, the particles 6 occupy the second extreme position and the picture element has a substantially black appearance, denoted as B, which is closest to the position of the particles 6 which corresponds to the image information, i.e. the picture element 2 having a dark gray appearance (G1). The grey scale potential difference is present from time t3 to time t4 and has e.g. a value of e.g. 15 Volts and a duration of e.g. 50 ms. As a result the picture element 2 has an appearance being dark gray (G1), for displaying the picture. As another example the appearance of another picture element is light gray (G2) before application of the reset potential difference. Furthermore, the picture appearance corresponding to the image information of this picture element is substantially white (W). For this example, the potential difference of the picture element is shown as a function of time in FIG. 6B. The reset potential difference has e.g. a value of 15 Volts and is present from time $t_1$ to time $t'_2$. The reset duration is e.g. 50 ms. As a result, the particles 6 occupy the first extreme position and the picture element has a substantially white appearance (W), which is closest to the position of the particles 6 which corresponds to the image information, i.e. the picture element 2 having a substantially white appearance. The grey scale potential difference is present from time $t_3$ to time $t_4$ and has a value of 0 Volts because the appearance is already substantially white, for displaying the picture.

Figure 7:
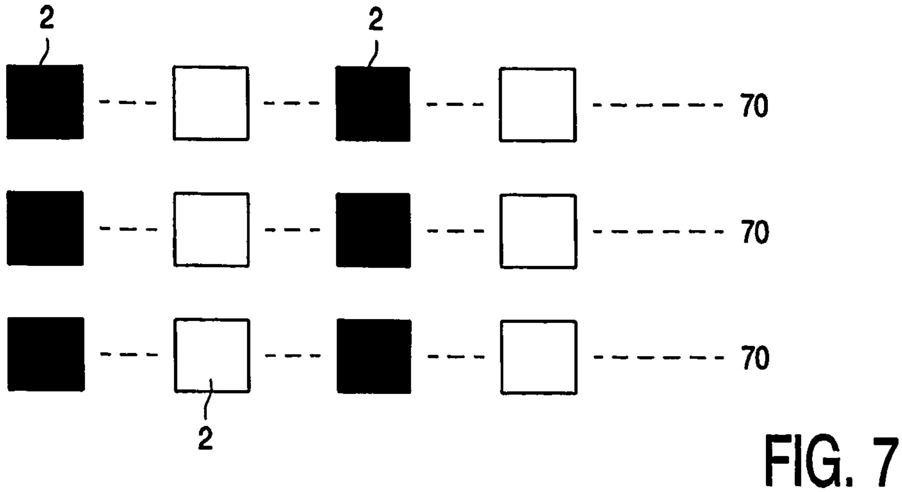
FIG. 7 shows the picture representing an average of the first and the second appearances as a result of the reset potential differences.

In FIG. 7 the picture elements are arranged along substantially straight lines 70. The picture elements have substantially equal first appearances, e.g. white, if particles 6 substantially occupy one of the extreme positions, e.g. the first extreme position. The picture elements have substantially equal second appearances, e.g. black if particles 6 substantially occupy the other one of the extreme positions, e.g. the second extreme position. The drive means are further arranged for controlling the reset potential differences of subsequent picture elements 2 along on each line 70 to enable particles 6 to substantially occupy unequal extreme positions. FIG. 7 shows the picture representing an average of the first and the second appearances as a result of the reset potential differences. The picture represents substantially middle gray.

Figure 8:
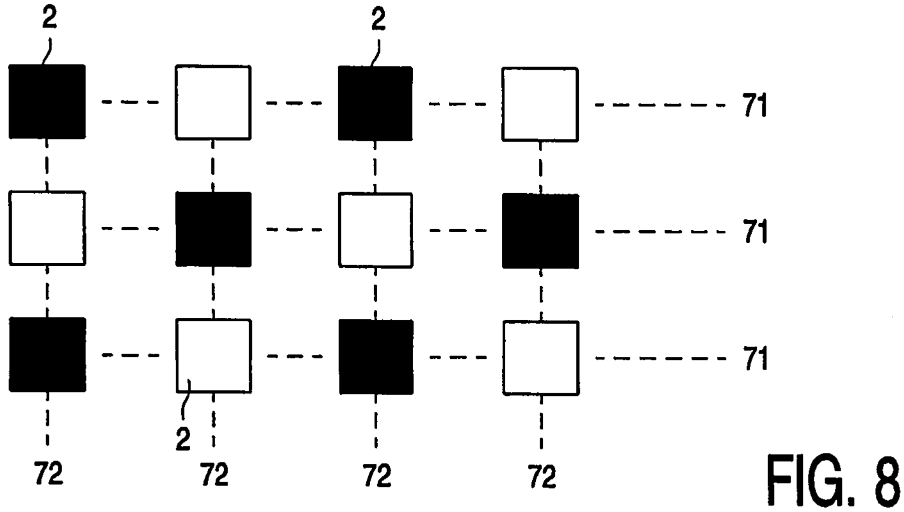
FIG. 8 shows the picture representing an average of the first and the second appearances as a result of the reset potential differences in another scheme.

In FIG. 8 the picture elements 2 are arranged along substantially straight rows 71 and along substantially straight columns 72 being substantially perpendicular to the rows in a two-dimensional structure, each row 71 having a predetermined first number of picture elements, e.g. 4 in FIG. 8, each column 72 having a predetermined second number of picture elements, e.g. 3 in FIG. 8. The picture elements have substantially equal first appearances, e.g. white, if particles 6 substantially occupy one of the extreme positions, e.g. the first extreme position. The picture elements have substantially equal second appearances, e.g. black, if particles 6 substantially occupy the other one of the extreme positions, e.g. the second extreme position. The drive means are further arranged for controlling the reset potential differences of subsequent picture elements 2 along on each row 71 to enable particles 6 to substantially occupy unequal extreme positions, and the drive means are further arranged for controlling the reset potential differences of subsequent picture elements 2 along on each column 72 to enable particles 6 to substantially occupy unequal extreme positions. FIG. 8 shows the picture representing an average of the first and the second appearances as a result of the reset potential differences. The picture represents substantially middle gray, which is somewhat smoother compared to the previous embodiment.

Figure 9:
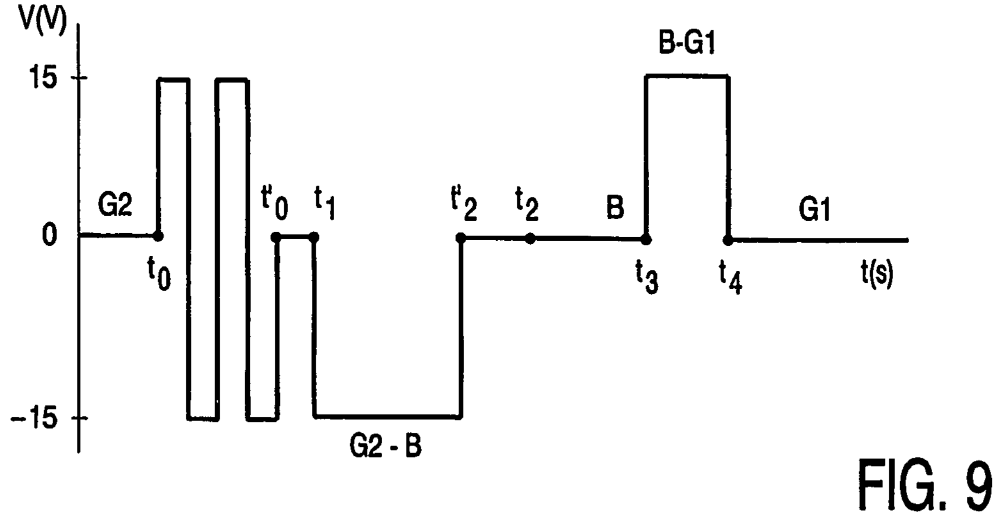
FIG. 9 shows diagrammatically the potential difference as a function of time for a picture element.

In variations of the device the drive means are further arranged for controlling the potential difference of each picture element to be a sequence of preset potential differences before being the reset potential difference and/or before being the grey scale potential differences. Preferably, the sequence of preset potential differences has preset values and associated preset durations, the preset values in the sequence alternate in sign, each preset potential difference represents a preset energy sufficient to release particles 6 present in one of the extreme positions from their position but insufficient to enable said particles 6 to reach the other one of the extreme positions. As an example the appearance of a picture element is light gray before the application of the sequence of preset potential differences. Furthermore, the picture appearance corresponding to the image information of the picture element is dark gray. For this example, the potential difference of the picture element is shown as a function of time in FIG. 9. In the example, the sequence of preset potential differences has 4 preset values, subsequently 15 Volts, −15 Volts, 15 Volts and −15 Volts, applied from time $t_0$ to time $t'_0$. Each preset value is applied for e.g. 20 ms. The time interval between $t'_0$ and $t_1$ is preferably relatively small. Subsequently, the reset potential difference has e.g. a value of −15 Volts and is present from time $t_1$ to time $t'_2$. The reset duration is e.g. 150 ms. As a result, the particles 6 occupy the second extreme position and the picture element has a substantially black appearance. The grey scale potential difference is present from time $t_3$ to time $t_4$ and has e.g. a value of e.g. 15 Volts and a duration of e.g. 50 ms. Prior to application of the grey scale potential difference preset pulses may also be applied (not shown in FIG. 9, but shown in FIG. 10 upper part). As a result the picture element 2 has an appearance being dark gray, for displaying the picture. Without being bound to a particular explanation for the mechanism underlying the positive effects of application of the preset pulses, it is presumed that the application of the preset pulses increases the momentum of the electrophoretic particles and thus shortens the switching time, i.e. the time necessary to accomplish a switch-over, i.e. a change in appearance. It is also possible that after the display device is switched to a predetermined state e.g. a black state, the electrophoretic particles are "frozen" by the opposite ions surrounding the particle. When a subsequent switching is to the white state, these opposite ions have to be timely released, which requires additional time. The application of the preset pulses speeds up the release of the opposite ions thus the de-freezing of the electrophoretic particles and therefore shortens the switching time.

It is remarked that, within the concept of the invention the application of reset potential difference may encompass, and in preferred embodiments does encompass, the application of overresetting. "Overresetting stands for methods of application of reset potentials in which purposively, at least for the transition of some grey scale state (intermediate states) reset pulses are applied which have a longer time×voltage difference than needed to drive the relevant element to the desired extreme optical state. Such overresetting may be useful to ensure that an extreme optical state is reached, or it may be used to simplify the application scheme, such that e.g. the same length of resetting pulse is used for the resetting of different grey scale to an extreme optical state.

All of the foregoing figures and explanations relate to the general principle of applying grey scale potential difference potentials possibly with the addition of applying preset pulses.

As explained above, the accuracy of the greyscales in electrophoretic displays is strongly influenced by image history, dwell time, temperature, humidity, lateral inhomogeneity of the electrophoretic foils etc. Using reset pulses accurate grey levels can be achieved since the grey levels are always achieved either from reference black (B) or from reference white state (W) (the two extreme states). Whilst this scheme results in images with acceptably low image retention, the image update, i.e. the transition from one image to another, was somewhat "jerky". In particular after over-resetting the pixels to form the new (black/white) image, the introduction of the grey levels [(V,t)drive] happens rather abruptly. When a series of changing images according to this existing drive method were shown, this abrupt image update was perceived as unpleasant, to some even as disrupting.

It is an object of the invention to provide a display panel of the kind mentioned in the opening paragraph which is able to provide a smoother change over from one image to another.

The object is thereby achieved that the drive means are further arranged for application of the grey scale potential difference for setting the grey scale (G1, G2) of a picture element from an preceding optical position (B, W) in two or more pulses separated by a time period. Preferably, the pulses have the same polarity.

When reset pulses are applied the preceding optical states are extreme optical states (B,W).

In a device and method in accordance with the invention, a driving method is used whereby the image update is made less abrupt by more gradually introducing the greyscales into the image, due to the fact that the application of the grey scale potential difference is distributed over at least two pulses separated by a time period in which no pulse is intentionally applied or a voltage pulse with a voltage level substantially equal/close to zero is applied.

Whilst gradual introduction of the grey scales slightly increases the image update time, the smoother image transition resulting from the invention was found to greatly reduce the above mentioned "jerky" transition effect and much more acceptable to viewers.

Splitting the grey scale potential pulse into multiple short pulses provides for a smoother transition and a decrease in the shock effect. Since splitting of the grey scale potential pulses costs energy, the best solution depends on a trade-off between energy requirements and smoothing effect. Depending on this trade-off in embodiments the grey scale potential difference pulse may be split into two, three or more short pulses.

A few embodiment of device and methods in accordance with the invention will now be further exemplified.

EMBODIMENT 1

Gradual Greyscale Addition Using Periodic Drive Pulses

Figure 10:
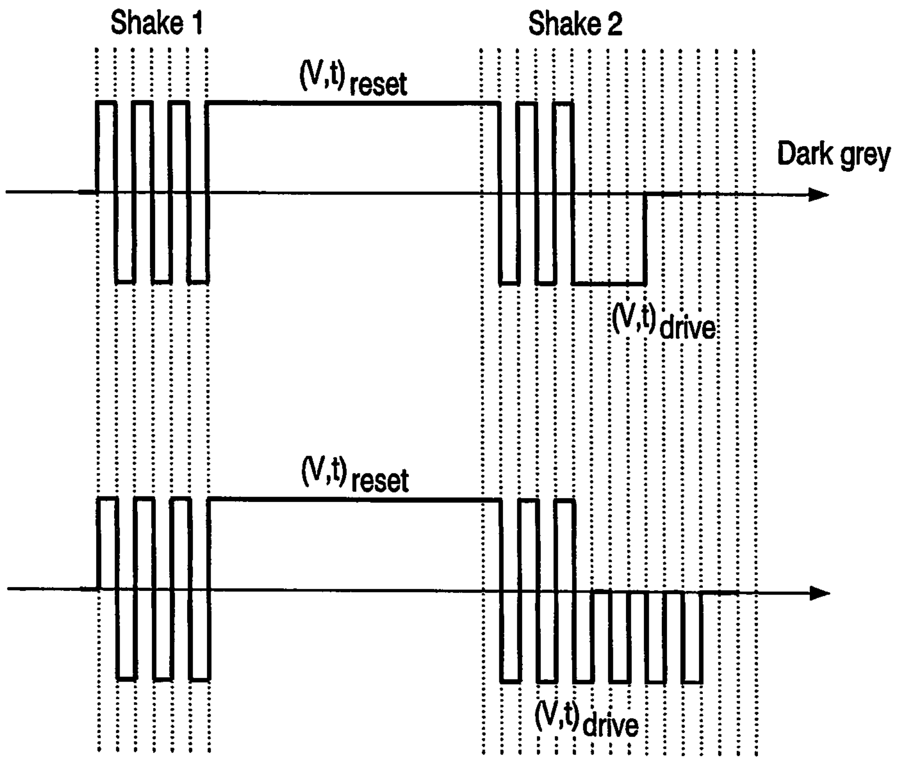
FIG. 10 illustrates an embodiment of the invention.

FIG. 10 illustrates in the top part of the figure a method with introduction of grey scale in a single pulse, preceded by a series of preset pulses. Such as scheme falls outside the scope of the invention, since the grey scale pulse is applied as a single pulse. The bottom half illustrates a method in accordance with embodiment 1 of the invention. In embodiment 1 the invention is implemented by gradually introducing the grey level using a regularly spaced series of drive pulses of fixed magnitude and time. An example for the transition from white to dark grey is shown in FIG. 10 (bottom). For the transition from white to dark grey a positive reset pulse with the maximum available voltage is used to set the display to the black state, from where the dark grey level is gradually added using a short periodic negative pulse. The greyscale realised after this series of pulses is substantially identical to that of the prior art, as the product of (voltage×time) for the total drive pulse is equivalent in both cases. Small adjustments to account for e.g. dwell time problems it may be used to slightly adjust the total drive time to realise the required greyscale. In either case however, the image update appears to be far smoother. The phrase "shake 1" and "shake 2" indicates the application of preset pulses prior to application of a reset pulse $(V,t)_{reset}$ and application of the grey scale potential difference pulse(s) $(V,t)_{drive}$

EMBODIMENTS 2

Gradual Greyscale Addition Using Drive Pulses with Irregular Periods

Figure 11:
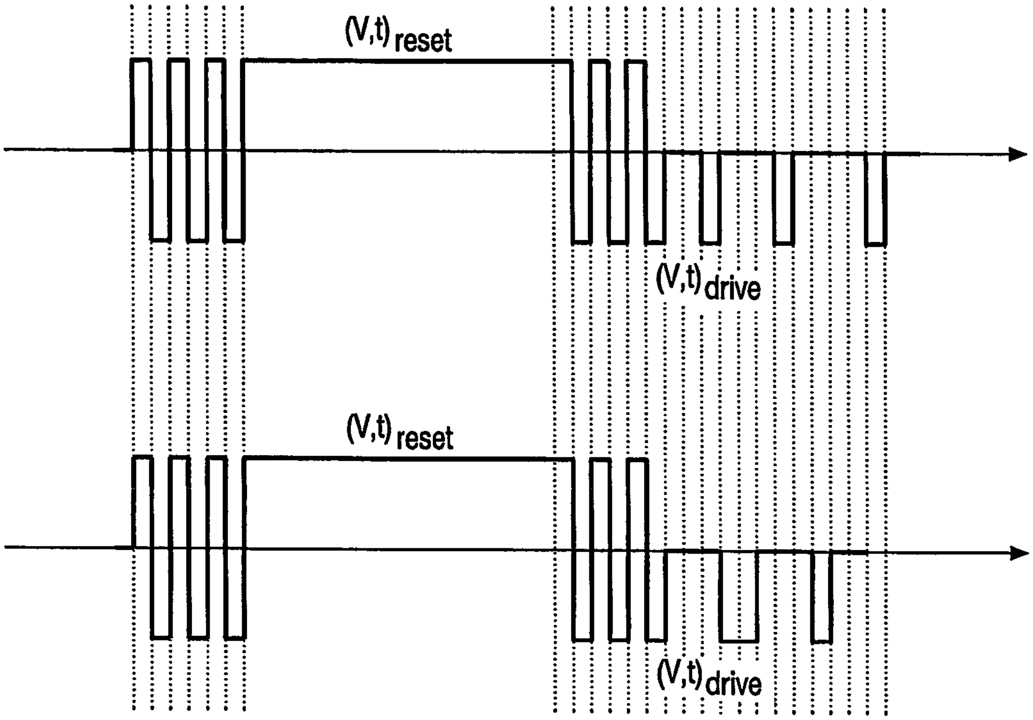
FIG. 11 illustrates further embodiments of the invention.

In embodiment 2, this invention is implemented by gradually introducing the grey level using an irregularly spaced series of drive pulses of fixed magnitude and time. An example for the transition from white to dark grey is shown in FIG. 11 (top). For the transition from white to dark grey a positive reset pulse with the maximum available voltage is used to set the display to the black state, from where the dark grey level is gradually added using a short negative pulse with an irregular period between drive pulses. Again, the grey scale realized after this series of pulses is substantially identical to that of the prior art, as the product of (voltage×time) is equivalent in both cases. Slight adjustment, to account e.g. for dwell time problems may be implemented to slightly adjust the drive time to realize the required grey scale.

In addition, it has been noticed by the inventors that the initial optical response of ink in the black or white state (i.e. at the "extreme optical states" after the reset) after applying a drive voltage, i.e. the grey scale difference potential) is relatively slower than when the ink has moved away from these extreme optical states. For this reason, in a preferred embodiment of embodiment 2, the period between 2 drive pulses is increased as the driving time increases (see FIG. 2). In this case the image update appears to be optically even smoother.

EMBODIMENTS 3

Gradual Greyscale Addition Using Drive Pulses with Irregular Pulse Duration

In embodiment 3, the invention is implemented by gradually introducing the grey level using a regularly spaced series of drive pulses of fixed magnitude and irregular duration. An example for the transition from white to dark grey is shown in FIG. 11 (bottom). For the transition from white to dark grey a positive reset pulse with the maximum available voltage is used to set the display to the black state, from where the dark grey level is gradually added using a periodic negative pulse of irregular duration. Again, the grey scale realized after this series of pulses is substantially identical to that of the prior art, as the product of (voltage×time) is equivalent in both cases. To account for e.g. dwell time problems it may be preferred to slightly adjust the drive time to realize the required grey scale.

In addition, the inventors have realized that, the initial optical response of an ink in the black or white state (i.e. at the "extreme optical states" after the reset) after applying a drive voltage is relatively slower than when the ink has moved away from these extreme optical states. For this reason, in a preferred embodiment of embodiment 3, in preferred embodiments to the duration of drive pulses decreases as the driving time increases (see FIG. 11). In this case the image update appears to be optically even smoother.

EMBODIMENTS 4

Gradual Grey Scale Addition Using Drive Pulses with Irregular Periods and Pulse Times In embodiment 4, this invention is implemented by gradually introducing the grey level using an irregularly spaced series of drive pulses of fixed magnitude and irregular duration, basically a combination of the embodiments. This provides even more flexibility to ensure that the image update appears to be optically even smoother.

It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

In short the invention can be described as an electrophoretic display panel and a method for driving an electrophoretic display panel in which the drive pulse, i.e. the grey scale pulse, applied after the reset pulse is split in more than one sub-pulses. A more gradual introduction of the grey scale is thereby achieved reducing the suddenness of the transition form one image to another.

The invention is also embodied in any computer program comprising program code means for performing a method in accordance with the invention when said program is run on a computer as well as in any computer program product comprising program code means stored on a computer readable medium for performing a method in accordance with the invention when said program is run on a computer, as well as any program product comprising program code means for use in display panel in accordance with the invention, for performing the action specific for the invention.

The present invention has been described in terms of specific embodiments, which are illustrative of the invention and not to be construed as limiting. The invention may be implemented in hardware, firmware or software, or in a combination of them. Other embodiments are within the scope of the following claims.

In the time interval between two subsequent sub-drive pulses, the voltage level is substantially zero. However, it is not excluded that a non-zero voltage level is applied in the time period as long as the voltage level is below the threshold voltage of the display material, i.e. the particles would not move under the influence of this voltage level. This may occur when the source driver output is not ideally zero or when one wants to make use of this time period for other purposes such as dc-balancing.

It is remarked that the amplitude of the sub-pulses of the grey scale pulse needs not have the same amplitude. One of the above described preferred embodiments for instance is characterized in that the drive means are arranged for application of the grey scale potential difference in two or more pulses wherein the applied pulses have decreasing time duration as the driving time increases. A similar effect is obtainable by arranging the drive means such that the applied split grey scale pulses have decreasing amplitude (but a similar length in time) as the driving time increases. In both of these examples the energy in the spilt pulses decreases as driving time increases. Also, the electrode structure is not limited but structures such as with top and bottom electrode, with honeycomb electrode structures may be used.

In short the invention may be described by:

An electrophoretic display panel and a method for driving an electrophoretic display panel in which the drive pulse, i.e. the grey scale pulse, to bring an element from a preceding optical state to an optical state is split in more than one sub-pulses. A more gradual introduction of the grey scale is thereby achieved reducing the suddenness of the transition, "jerkiness", from one image to another. Preferably application of the grey scale potential differences is preceded by application of reset pulses in which case the preceding optical state is an extreme optical state.

It will be obvious that many variations are possible within the scope of the invention without departing from the scope of the appended claims.

For instance, in all of the above given exemplary embodiments the drive means are arranged to apply reset pulses prior to the application of grey scale pulses.

The invention is particularly suitable for such devices, but not restricted to devices and method and driving schemes in which use is made of reset pulses. The invention relates to the application of grey scale pulses in two or more sub-pulses separated by time intervals.

Figure 12:
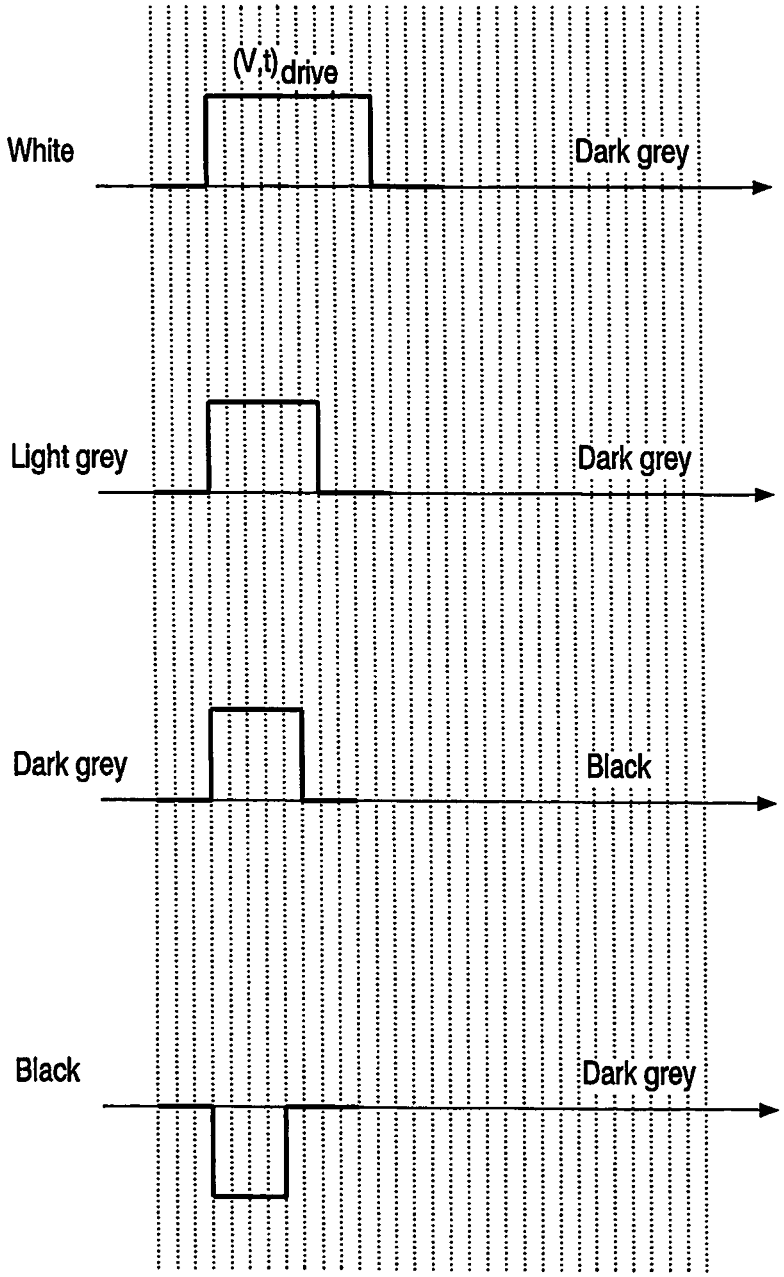
FIG. 12 illustrates application of grey scale pulses in singular pulse without the application of reset pulses.

As an illustration of devices, methods and driving schemes not using reset pulses FIG. 12 illustrates driving schemes in which for the transition of a grey scale to another grey scale single drive pulse is used. The initial (starting) optical position (i.e. grey scale, e.g. white, black, light grey, dark grey) is given at the left hand side of the figure. The driving pulse is schematically given and at the right hand side the resulting grey scale is given.

In the example of FIG. 12 a single grey scale pulse is applied, thus this figure illustrates a driving scheme outside the scope of the invention.

Figure 13:
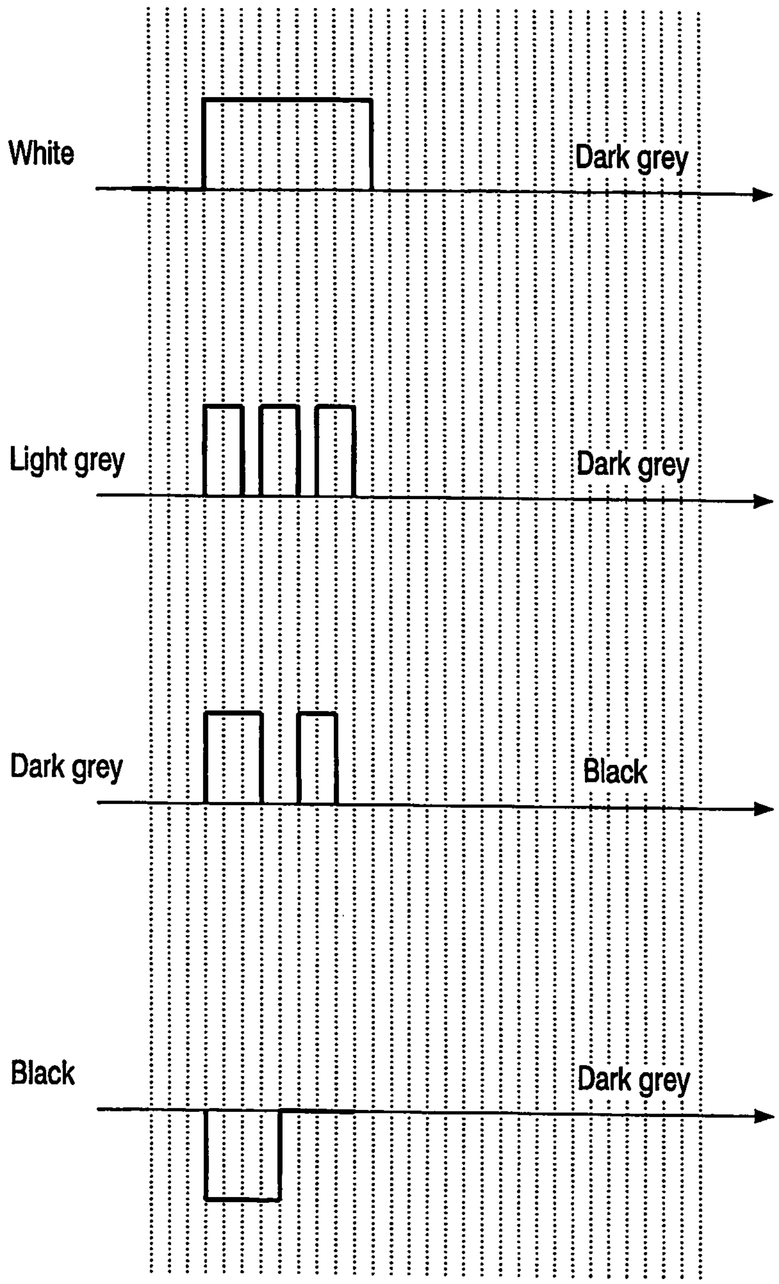
FIG. 13 illustrates the invention without the use of reset pulses.

FIG. 13 illustrates driving schemes within the scope of the invention. As in FIG. 12, the left hand side gives the initial optical state, the right hand side the final optical state, and the driving pulses are illustrated in between the left and right hand side. In these examples the grey scale pulse (V,t)drive is applied in a series (two or more) of sub-pulses separated by a time interval. The bottom part of the figure illustrates a situation as already explained above in which for the transition from one optical state (black) to a close optical state (dark grey) the drive pulse is still one single short pulse.

In the schemes illustrated in FIGS. 12 and 13 the preceding optical state, i.e. the optical state of an element immediately preceding application of grey scale potential differences, may be any optical state (black, white, dark grey or light grey), not necessarily an extreme optical state as in FIGS. 10 and 11. The advantage of the invention is for the schemes shown in FIGS. 12 and 13, as it is in the examples given in FIGS. 10 and 11, that the jerkiness of the image transition is reduced, i.e. the image transition is smoother. The jerkiness of the image transition is, however, the more visible when reset pulses are used, since the application of the reset pulses creates a purely black and white image immediately preceding the application of the grey scale difference. In such circumstances the sudden changes in the image due to the application of grey scale differences are more visible then when a transition is made form one grey tone image to another, as in the examples of FIGS. 12 and 13.

Figure 14:
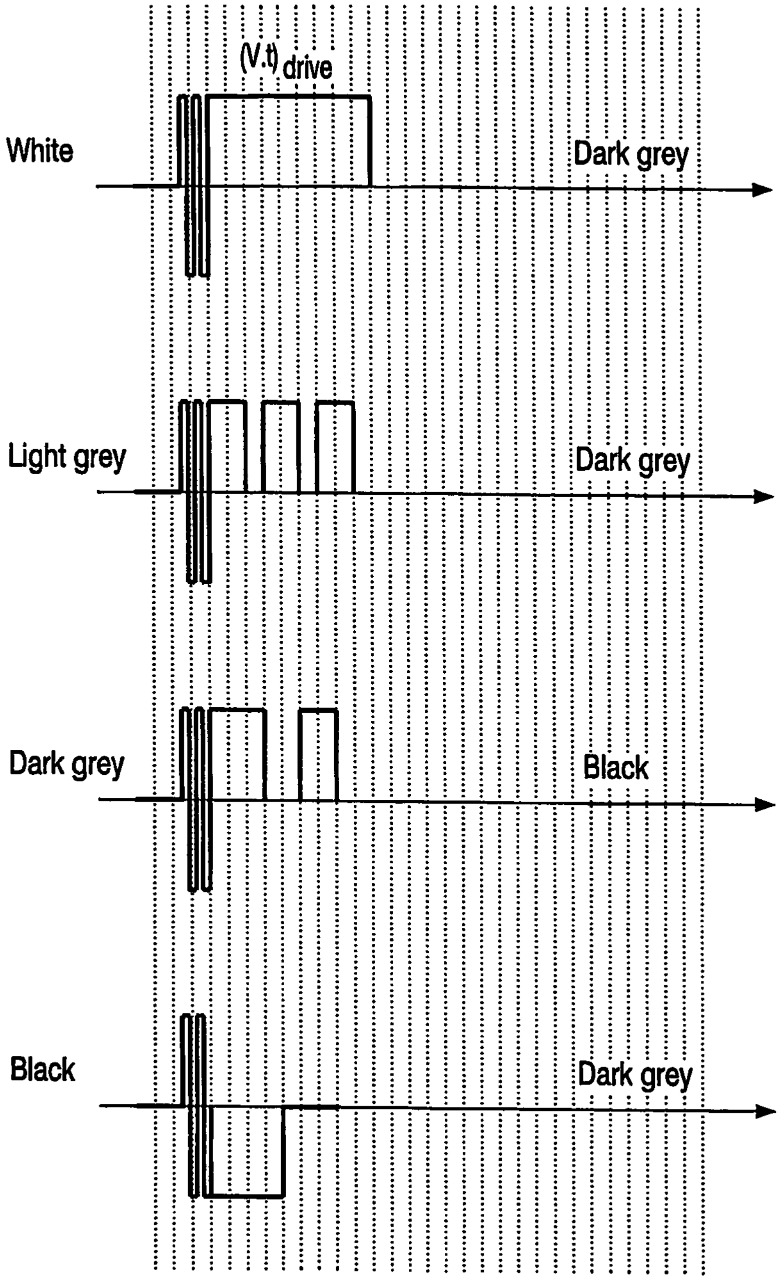
FIG. 14 illustrates a variation on the scheme of FIG. 13 in which preset pulses are used.

FIG. 14 illustrates another example embodiment of the driving schemes within the scope of the invention, in which four preset pulses alternating in sign are applied prior to the driving pulse. As in FIG. 13, the left hand side gives the initial optical state, the right hand side the final optical state, and the driving pulses are illustrated in between the left and right hand side. In these examples the grey scale pulse (V,t)drive is applied in a series (two or more) of sub-pulses separated by a time interval. The bottom part of the figure illustrates a situation as already explained above in which for the transition from one optical state (black) to a close optical state (dark grey) the drive pulse is still one single short pulse. A more accurate grey state may be obtained.

Within the framework of the invention all combinations of features disclosed are enclosed, even if not explicitly claimed. For instance, the split grey scale potential differences may be preceded, and preferably are preceded, by reset pulses, reset pulses and/or grey scale pulses may be preceded by preset pulses sequences.

The invention claimed is:

1. An electrophoretic display panel that is drivable between extreme positions and states between said extreme positions, the electrophoretic display panel comprising:

an electrophoretic medium comprising charged particles;

a plurality of picture elements having electrodes associated with each picture element for receiving a potential difference; and drive means comprising at least a processor, the drive means being configured to provide a driving waveform to drive at least one of the picture elements from a first gray scale to an intended gray scale, the driving waveform comprising, in sequence:

a first sequence of preset potential differences having first preset values and associated first preset durations, the first preset values in the first sequence alternating in sign, each first preset potential difference representing a preset energy sufficient to release particles present in a first one of said extreme positions from their position but insufficient to enable said particles to reach a second one of the extreme positions;

a reset potential difference to drive the particles to occupy an extreme position which is determined based on which extreme position is closest to a position of the particles which corresponds to the intended gray scale, wherein a sign of the reset potential difference is opposite to a sign of the last preset potential difference in the first sequence;

a second sequence of preset potential differences having second preset values and associated second preset durations, the second preset values in the second sequence alternating in sign, each second preset potential difference representing a preset energy sufficient to release particles present in the extreme position driven by the reset potential difference but insufficient to enable the particles to reach the other one of the extreme positions, wherein a sign of the first preset potential difference in the second sequence is opposite to the sign of the reset potential difference; and two or more driving pulses for driving the particles to a position corresponding to the intended grey scale, the driving pulses being separated by at least one non-zero time interval.

2. The electrophoretic display panel as claimed in claim 1, wherein the drive means is configured to, during the non-zero time interval, apply a voltage value below a threshold voltage value below which the particles remain substantially in their position.

3. The electrophoretic display panel as claimed in claim 1, wherein the drive means is configured to, during the non-zero time interval, apply a voltage value of substantially zero.

4. The electrophoretic display panel as claimed in claim 1, wherein time durations of the driving pulses decrease as a driving time, measured from a beginning time of the driving pulse, increases.

5. The electrophoretic display panel as claimed in claim 1, wherein amplitudes of the driving pulses decrease as a driving time, measured from a beginning time of the driving pulse, increases.

6. The electrophoretic display panel as claimed in claim 1, wherein the driving pulses have more than two pulses, the pulses are separated by at least two non-zero time intervals, and the time intervals increase as a driving time, measured from a beginning time of the driving pulse, increases.

7. A method for driving a pixel of an electrophoretic display device from a first gray scale to an intended gray scale, the electrophoretic display device comprising particles and being drivable between extreme positions and states between said extreme positions, the method comprising acts in sequence of:

driving the pixel with a first sequence of preset potential differences having first preset values and associated first preset durations, the first preset values in the first sequence alternating in sign, each first preset potential difference representing a preset energy sufficient to release particles present in a first one of said extreme positions from their position but insufficient to enable the particles to reach a second one of the extreme positions;

driving the pixel with a reset potential difference to move the particles to occupy an extreme position which is determined based on which extreme position is closest to a position of the particles which corresponds to the intended gray scale, wherein a sign of the reset potential difference is opposite to a sign of the last preset potential difference in the first sequence;

driving the pixel with a second sequence of preset potential differences having second preset values and associated second preset durations, the second preset values in the second sequence alternating in sign, each second preset potential difference representing a preset energy sufficient to release particles present in the extreme position driven by the reset potential difference but insufficient to enable the particles to reach the other one of the extreme positions, wherein a sign of the first preset potential difference in the second sequence is opposite to the sign of the reset potential difference; and driving the pixel with two or more driving pulses for moving the particles to a position corresponding to the intended grey scale, the driving pulses being separated by at least one non-zero time interval.

8. The method as claimed in claim 7, wherein amplitudes of the driving pulses decrease as a driving time, measured from a beginning time of the driving pulse, increases.

9. The method as claimed in claim 7, wherein the driving pulses have more than two pulses, the pulses are separated by at least two non-zero time intervals, and the time intervals increase as a driving time, measured from a beginning time of the driving pulse, increases.

10. The method as claimed in claim 7, wherein time durations of the driving pulses decrease as a driving time, measured from a beginning time of the driving pulse, increases.

11. A non-transitory computer readable medium storing computer code which, when executed by a computer, causes the computer to perform the method as claimed in claim 7.

12. Drive means comprising a processor for driving a pixel of an electrophoretic display panel from a first gray scale to an intended gray scale, the electrophoretic display device comprising particles and being drivable between extreme positions and states between said extreme positions, the drive means being configured to:

drive the pixel with a first sequence of preset potential differences having first preset values and associated first preset durations, the first preset values in the first sequence alternating in sign, each first preset potential difference representing a preset energy sufficient to release particles present in a first one of said extreme positions from their position but insufficient to enable the particles to reach a second one of the extreme positions;

subsequently, drive the pixel with a reset potential difference to move the particles to occupy an extreme position which is determined based on which extreme position is closest to a position of the particles which corresponds to the intended gray scale, wherein a sign of the reset potential difference is opposite to a sign of the last preset potential difference in the first sequence;

subsequently, drive the pixel with a second sequence of preset potential differences having second preset values and associated second preset durations, the second preset values in the second sequence alternating in sign, each second preset potential difference representing a preset energy sufficient to release particles present in the extreme position driven by the reset potential difference but insufficient to enable the particles to reach the other one of the extreme positions, wherein a sign of the first preset potential difference in the second sequence is opposite to the sign of the reset potential difference; and subsequently, drive the pixel with two or more driving pulses for moving the particles to a position corresponding to the intended grey scale, the driving pulses being separated by at least one non-zero time interval.

13. The electrophoretic display panel as claimed in claim 1, further comprising a plurality of capacitors, at least one one of the capacitors being connected to each picture element and to one or more storage capacitor lines.

14. The electrophoretic display panel as claimed in claim 12, further comprising a plurality of capacitors, at least one one of the capacitors being connected to each picture element and to one or more storage capacitor lines.

* * * * *

UNITED STATES PATENT AND TRADEMARK OFFICE

CERTIFICATE OF CORRECTION

PATENT NO. : 8,531,389 B2
APPLICATION NO. : 10/568644
DATED : September 10, 2013
INVENTOR(S) : Mark Thomas Johnson, Guofu Zhou and Neculai Ailenei It is certified that error appears in the above-identified patent and that said Letters Patent is hereby corrected as shown below:

Title Page, in the Abstract, item (57), Line 6, please delete "form" and substitute therefor --from--.

In the Claims

At Column 15, Line 15, please delete "one one" and substitute therefor --one--.

At Column 15, Lines 19-20, please delete "one one" and substitute therefor --one--.

Signed and Sealed this
Twelfth Day of November, 2013

Teresa Stanek Rea
*Deputy Director of the United States Patent and Trademark Office*